(12) United States Patent
Watanabe et al.

(10) Patent No.: US 7,240,398 B2
(45) Date of Patent: Jul. 10, 2007

(54) OPENING AND CLOSING DAMPING APPARATUS

(75) Inventors: Toshiko Watanabe, Kanagawa (JP); Tetsuji Hirano, Kanagawa (JP)

(73) Assignee: Piolax Inc., Yokahama-shi, Kanagawa-ken (JP)

( * ) Notice: Subject to any disclaimer, the term of this patent is extended or adjusted under 35 U.S.C. 154(b) by 0 days.

(21) Appl. No.: 10/924,259

(22) Filed: Aug. 24, 2004

(65) Prior Publication Data

US 2005/0076471 A1   Apr. 14, 2005

(30) Foreign Application Priority Data

Aug. 25, 2003  (JP) ............... P.2003-300110

(51) Int. Cl.
   *E05F 3/00*  (2006.01)
   *G05G 3/00*  (2006.01)
(52) U.S. Cl. ................ 16/51; 16/50; 16/412
(58) Field of Classification Search ............... 16/438, 16/429, 444, 445, 412, DIG. 24, 51, 50, 49, 16/DIG. 9, DIG. 17; 188/290; 267/137, 267/136, 152, 153; 296/214, 210, 39.1, 1.1; 224/268, 313, 553, 560, 927; 74/574.4
See application file for complete search history.

(56) References Cited

U.S. PATENT DOCUMENTS

| 5,276,945 | A | * | 1/1994 | Matsumura ............ 16/337 |
| 5,366,127 | A | * | 11/1994 | Heinz ................. 224/313 |
| 5,582,276 | A | * | 12/1996 | Berteau ............. 188/82.84 |
| 5,820,205 | A | * | 10/1998 | Ammons ............... 296/214 |
| 6,076,233 | A | * | 6/2000 | Sasaki et al. ........... 16/444 |
| 6,095,469 | A | * | 8/2000 | Von Alman ............ 248/304 |
| 6,397,435 | B1 | * | 6/2002 | Gosselet ............... 16/438 |
| 6,457,690 | B1 | * | 10/2002 | Spykerman et al. ..... 248/305 |
| 6,467,130 | B2 | * | 10/2002 | Kurachi et al. .......... 16/438 |
| 6,511,036 | B1 | * | 1/2003 | Hansen ................ 248/596 |
| 6,643,897 | B2 | * | 11/2003 | Chang .................. 16/248 |
| 6,662,683 | B1 | * | 12/2003 | Takahashi et al. ...... 74/573 F |
| 6,715,813 | B2 | * | 4/2004 | Thompson et al. ...... 296/1.02 |
| 6,729,447 | B2 | * | 5/2004 | Takahashi ............. 188/291 |
| 6,817,061 | B2 | * | 11/2004 | Wu et al. .............. 16/308 |
| 6,836,932 | B2 | * | 1/2005 | Yamamoto et al. ...... 16/110.1 |
| 6,840,355 | B2 | * | 1/2005 | Iwashita .............. 188/290 |
| 2004/0163223 | A1 | * | 8/2004 | Bivens et al. .......... 24/582.1 |

FOREIGN PATENT DOCUMENTS

| DE | EP0 830986 A2 | * | 8/1997 |
| JP | 10-54171 | | 2/1998 |
| JP | 2002-193012 | | 7/2002 |

* cited by examiner

*Primary Examiner*—Robert J. Sandy
*Assistant Examiner*—Andre' L. Jackson
(74) *Attorney, Agent, or Firm*—McGinn IP law Group, PLLC

(57) ABSTRACT

An annular groove part with a predetermined depth is formed in a rotation body, and a wall surface of the annular groove part is sealed by a second protrusion elongated annular part formed in an inner circumference of a rotor attached to the annular groove part, and a wall surface of the annular groove part is sealed by a first protrusion elongated annular part formed in an outer circumference of the rotor, and grease is sealed in the inside. When the rotor is engaged in a support body and the rotation body is rotated, rotation of the rotor is regulated, so that the rotation body is damped by fluid resistance of the grease and is slowly rotated. The rotation body is supported by a support shaft inserted into a shaft hole.

10 Claims, 17 Drawing Sheets

OPENING AND CLOSING DAMPING APPARATUS

BACKGROUND OF THE INVENTION

1. Field of the Invention

The present invention relates to an opening and closing damping apparatus for slowly opening and closing a rotation body.

2. Description of the Related Art

Conventionally, structure bodies having various opening and closing mechanisms are provided in the vehicle interior of a vehicle such as an automobile. The structure bodies include a retractable hook apparatus, a retractable assist grip apparatus, a retractable storage box, a cup holder, a glove box, a console box, etc.

As the opening and closing mechanisms, there is also a mechanism for together providing an opening and closing damping mechanism which has a shaft part for supporting a rotation member, a support body for rotatably supporting the shaft part and a spring for always energizing the rotation member in an opening direction or a closing direction, and further slowly opens and closes the rotation member against energization force of the spring.

As the opening and closing damping mechanism, a grease damper constructed so that there are provided a cylindrical support body and a columnar shaft body which is inserted into this support body and also is integrated with an opening and closing body and a grease passage and a grease retention are formed in the shaft body and grease with a predetermined viscosity is injected between the shaft body and an inner circumference of the support body and thereby the grease is retained in the grease passage and the grease retention and the opening and closing body is slowly rotated by the viscosity of this grease is disclosed in, for example, JP-A-10-54171.

In this art, it is constructed so as to prevent leakage of the grease without using sealing means such as an O ring by using the grease with the predetermined viscosity and retaining the grease in the grease retention, so that the number of parts can be reduced.

Also, a rotary damper constructed so that grease or oil is not used as a member for damping opening and closing of an opening and closing body integrally provided in a shaft body and the opening and closing body is slowly rotated by friction sliding between a support body and the shaft body is disclosed in JP-A-2002-193012.

In this art, grease or oil acting as the damping member is not required, so that that the number of parts can be reduced.

However, in the art disclosed in JP-A-10-54171, the support body for rotatably supporting the shaft body is required, so that there is a problem that assembly and manufacture of the support body become complicated and product cost increases. Further, since the shaft body is used as a component of the damper, applied material is limited in the case of use in a place in which rigidity is required, so that there is a problem that it is lacking in versatility.

In addition, since a sealing member such as an O ring is not used, a certain level of viscosity is required in grease in order to prevent leakage of the grease, so that limitation is imposed on a choice of grease, for example, grease with a low viscosity cannot be used.

On the other hand, in the art disclosed in JP-A-2002-193012, opening and closing damping attempts to be applied by friction sliding between members without using grease, so that a contact region between the members tends to wear with time and there is a problem in durability.

SUMMARY OF THE INVENTION

An object of the invention is to provide an opening and closing damping apparatus in which a shaft body is not used as a component of a damper and also in the case of use in a place in which rigidity is required, a large load is not applied to the shaft body and use in a wide range is enabled and also durability is good.

In order to achieve the object, according to a first aspect of the invention, an opening and closing damping apparatus for applying damping to rotation of a rotation body pivoted openably and closably with respect to a support body, an engagement part is provided in one of the support body and the rotation body and an annular groove part with the bottom is provided on the same axis as the center of rotation of the other, and a substantially cylindrical rotor is fitted into the annular groove part with the bottom, and an engagement stop part engaged and stopped in the engagement part is provided in the end of the rotor, and a viscous member is interposed between the rotor and the annular groove part with the bottom.

According to the first aspect of the invention, it is constructed so that an engagement stop part provided in the end of a rotor formed in substantially cylindrical shape is engaged in an engagement part provided in one of a support body and a rotation body and the is fitted into an annular groove part with the bottom provided in the other of the support body and the rotation body and also a viscous member is interposed between the rotor and the annular groove part with the bottom and the rotation body is slowly rotated by fluid resistance of the viscous member, so that a large load is not applied to a shaft body for supporting the support body and the rotation body on the same axis and use in a wide range is enabled and also durability is good.

According to a second aspect of the invention in the first aspect of the invention, a first elastic annulus and a second elastic annulus are respectively provided in an outer circumference and an inner circumference of the rotor, and a first elastic protrusion elongated annulus and a second elastic protrusion elongated annulus for respectively abutting on a wall surface of the annular groove part with the bottom and sealing the viscous member are respectively provided in each of the elastic annuli.

According to the second aspect of the invention, even when a viscous member with a low viscosity is adopted, by elastic action of each the elastic annulus, leakage can be prevented and the viscous member can be sealed between the rotor and the annular groove with the bottom. As a result of that, a choice of grease increases and use under high temperature conditions on which viscosity tends to lower can also be made.

According to a third aspect of the invention in the second aspect of the invention, the first elastic annulus is provided in the bottom side of the annular groove part with the bottom from the second elastic annulus.

According to the third aspect of the invention, wall thickness of a rotor can be reduced to achieve miniaturization by offsetting axial arrangement of both the elastic annuli.

According to a fourth aspect of the invention in the second or third aspect of the invention, an air relief groove is provided between the end of the bottom side of the annular groove part with the bottom and the first elastic annulus and/or the second elastic annulus of the rotor.

According to the fourth aspect of the invention, in the case of inserting a rotor into an annular groove part with the bottom after a viscous member is charged into the annular groove part with the bottom, air remaining inside the annular groove part with the bottom can be released to an air relief groove, so that this air is not compressed more than necessary and a burst of the rotor and leakage of the viscous member can be prevented.

According to a fifth aspect of the invention in the second or third aspect of the invention, the first elastic annulus and the second elastic annulus are provided at a substantially equal distance from the bottom of the annular groove part with the bottom, and the air relief groove is formed continuously in the range from the end of the bottom side of the annular groove part with the bottom to at least one of the first elastic annulus and the second elastic annulus.

According to the fifth aspect of the invention, a region in which a viscous member is charged and abuts slidingly is formed long in an axial direction and a damper effect can be increased and also the air relief groove is formed continuously in the range from the end of the bottom side of the annular groove part with the bottom to at least one of the first elastic annulus and the second elastic annulus, so that air can be released until a rotor is substantially fully inserted into the annular groove part with the bottom, and leakage of the viscous member and a burst of the rotor due to compression of air sealed can be prevented more surely.

According to a sixth aspect of the invention in any of the first to fifth aspects of the invention, the engagement part is constructed of two protrusion elongated parts protruded in parallel and the engagement stop part is formed in protrusion shape engaged between both of said protrusion elongated parts.

According to the sixth aspect of the invention, assembly is completed by only fitting a protrusive engagement stop part provided in the end of a rotor between two protrusion elongated parts formed in one of a support body and a rotation body, so that assembly is facilitated. Further, a slidingly abutting region between the rotor and a viscous member can be provided long in an axial direction by providing the engagement stop part in the end of the rotor, so that utilization of a region for producing damping effect can be maximized.

According to the invention, it is constructed so that an engagement stop part provided in the end of a rotor formed in substantially cylindrical shape is engaged in an engagement part provided in one of a support body and a rotation body and the is fitted into an annular groove part with the bottom provided in the other of the support body and the rotation body and also a viscous member is interposed between the rotor and the annular groove part with the bottom and the rotation body is slowly rotated by fluid resistance of the viscous member, so that there can be provided an opening and closing damping apparatus in which a large load is not applied to a shaft body for supporting the support body and the rotation body on the same axis and use in a wide range is enabled and also durability is good.

BRIEF DESCRIPTION OF THE DRAWINGS

These and other objects and advantages of this invention will become more fully apparent from the following detailed description taken with the accompanying drawings in which:

FIG. 11A is a sectional view corresponding to FIG. 10, and FIG. 11B is a main exploded perspective view of a portion for applying opening and closing damping;

FIG. 13A is a sectional view seen from the end side of a rotation body, FIG. 13B is a sectional view taken on line I—I of FIG. 13A, and FIG. 13C is a sectional view taken on line II—II of FIG. 13A;

DETAILED DESCRIPTION OF THE PREFERRED EMBODIMENTS

Figure 1:
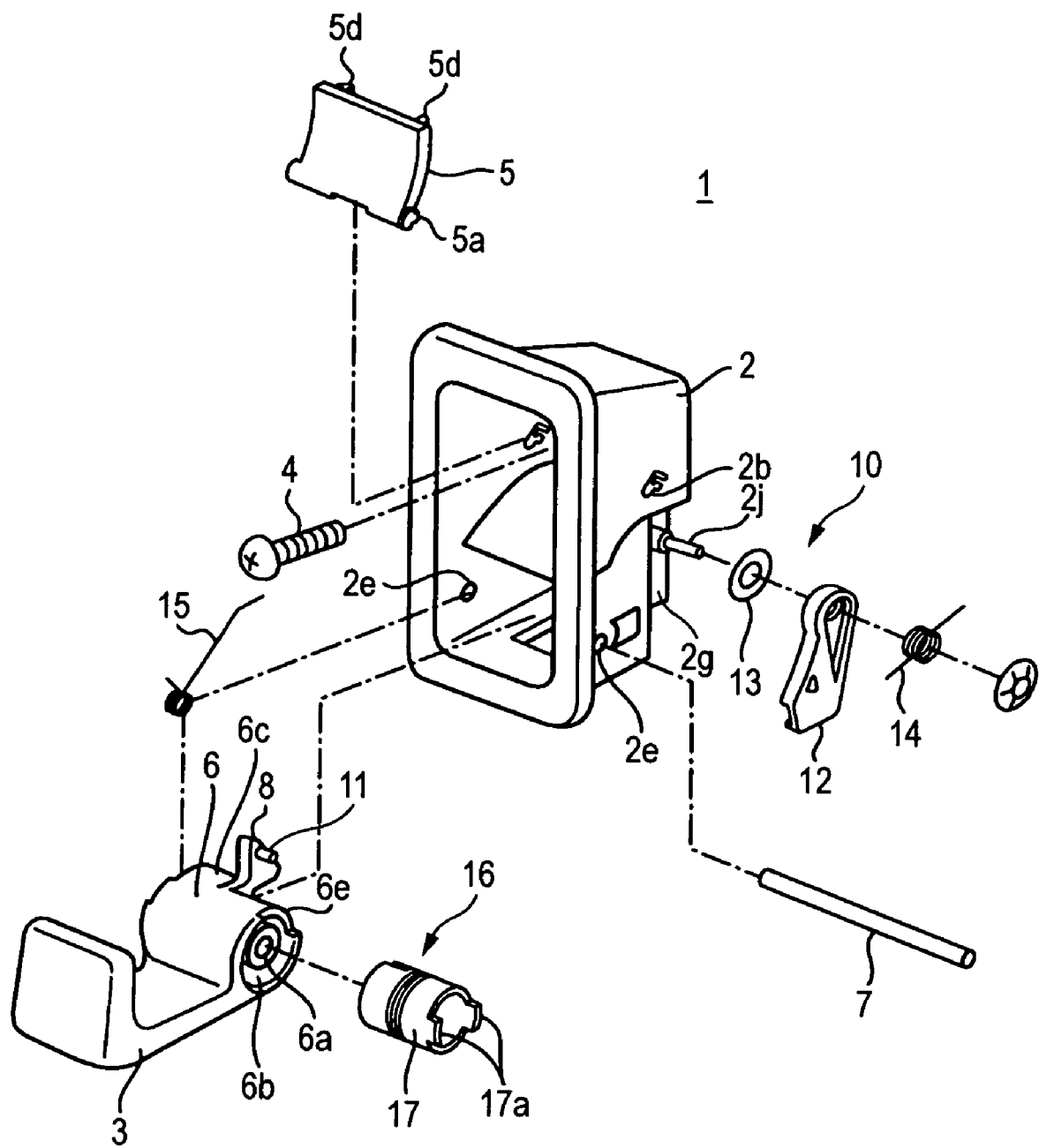
FIG. 1 is an exploded perspective view of a retractable hook apparatus according to a first embodiment.

One embodiment of the invention will be described below based on the drawings. A first embodiment of the invention is shown in FIGS. 1 to 10. An exploded perspective view of a retractable hook apparatus is shown in FIG. 1.

Numeral 1 of FIG. 1 is a retractable hook apparatus to which the invention is applied, and is provided in the vehicle interior. A retractable hook apparatus 1 comprises a retracting case 2 acting as a support body mounted in the side of a vehicle body and a hook 3 rotatably supported in the retracting case 2, and the hook 3 is opened and closed with respect to the retracting case 2 through a well-known push and push mechanism. The hook 3 is used in the case of hooking a shopping bag etc. and when the hook is not used, the hook 3 is retracted in the retracting case 2.

The retracting case 2 is attached to a recess (not shown) formed in the vehicle body and is positioned and also is fixed in the vehicle body side by a screw 4 inserted into a screw insertion hole 2a bored in the upper side of a depth surface.

The front of the screw insertion hole 2a is hidden by a decorative plate 5.

Figure 3A:
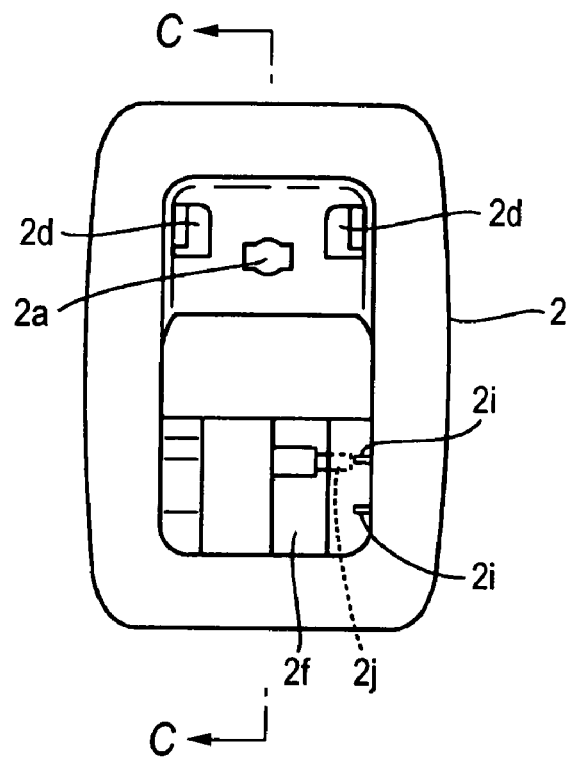
FIG. 3A is a front view of a retracting case and FIG. 3B is a side view of the retracting case and FIG. 3C is a sectional view taken on line C—C of FIG. 3A in the first embodiment.
Figure 3B:
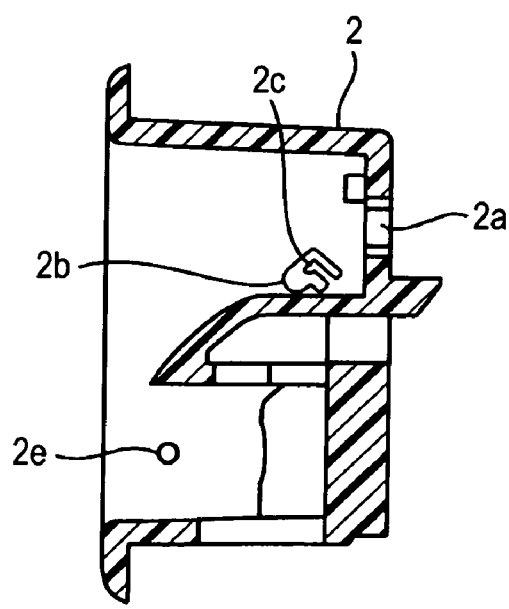
Figure 3C:
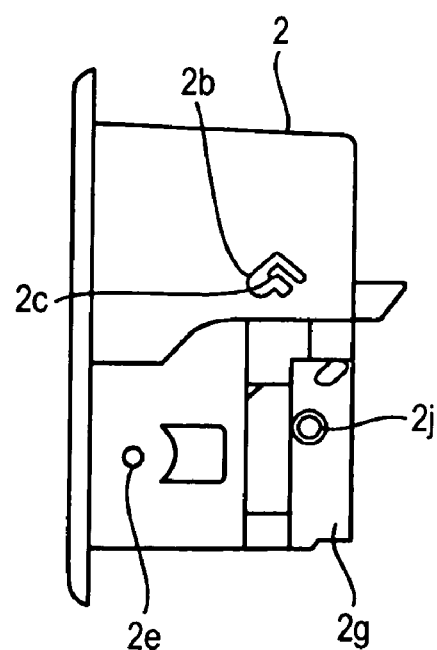
Figure 6A:
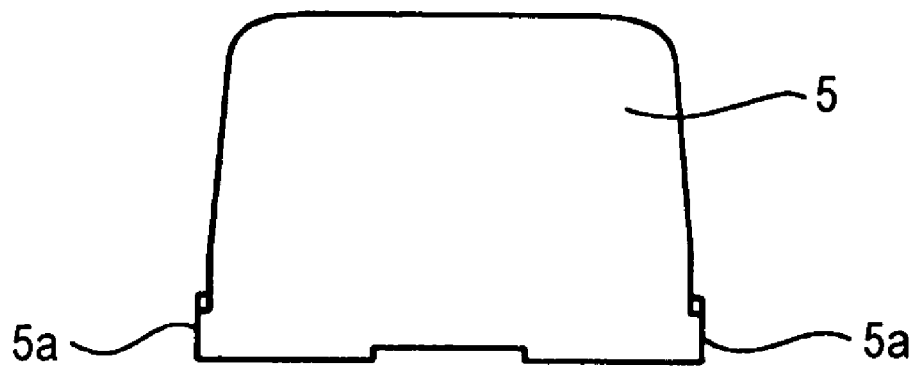
FIG. 6A is a front view of a decorative plate and FIG. 6B is a right side view of the decorative plate in the first embodiment.
Figure 6B:
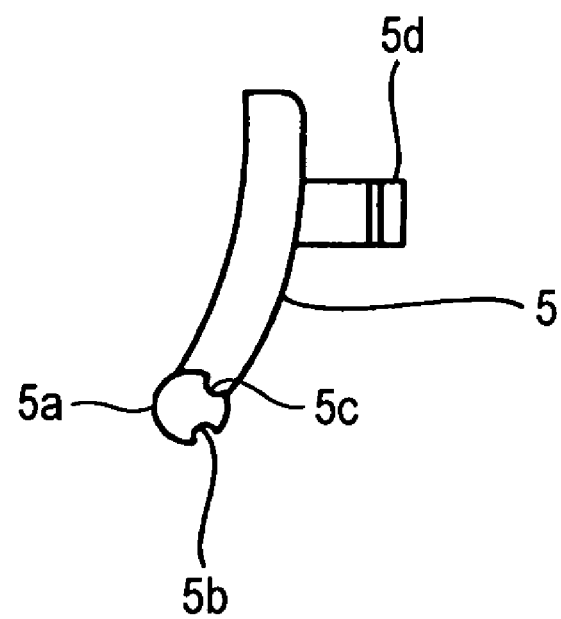
Figure 7:
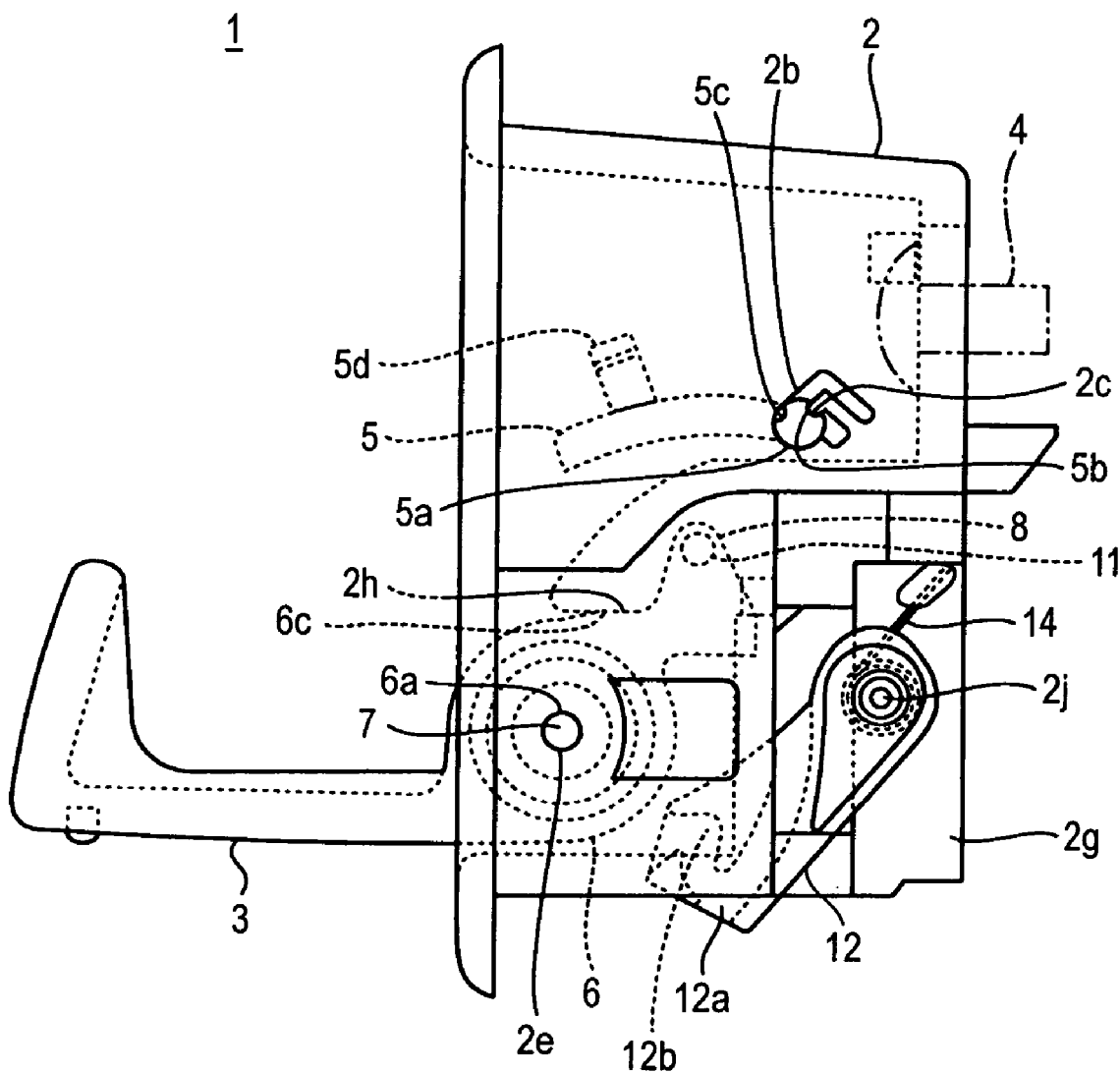
FIG. 7 is a side view of the retractable hook apparatus in the first embodiment.

As shown in FIGS. 6A and 6B, bosses 5a are formed in both sides of a lower portion of the decorative plate 5, and a notch 5b for opened position holding and a notch 5c for closed position holding are respectively formed in an outer circumference of the boss 5a. On the other hand, as shown in FIGS. 3B, 3C and 7, a support hole part 2b for rotatably supporting the boss 5a is bored in the side of the retracting case 2, and a pawl part 2c integrally formed in the retracting case 2 faces this support hole part 2b. Further, hook parts 5d are integrally formed in both sides of an upper portion of the decorative plate 5. Also, hole parts 2d for engaging and stopping the hook parts 5d are bored in the bottom of the retracting case 2.

As shown in FIG. 7, in the decorative plate 5 at the time of shipment, the notches 5b for opened position holding formed in the bosses 5a are engaged and stopped in the pawl parts 2c to maintain an opened state. Therefore, even when the decorative plate 5 is influenced by vibration etc. at the time of transfer, the decorative plate 5 does not rattle and can hold the opened state. Also, by rotating the decorative plate 5 after the retracting case 2 is fixedly provided in the vehicle body through the screw 4, as shown by a solid line in FIG. 8, the notches 5c for closed position holding formed in the bosses 5a are engaged in the pawl parts 2c and the hook parts 5d formed in the upper portion are engaged in the hole parts 2d bored in the retracting case 2 to maintain a closed state and the screw 4 is hidden.

Figure 4A:
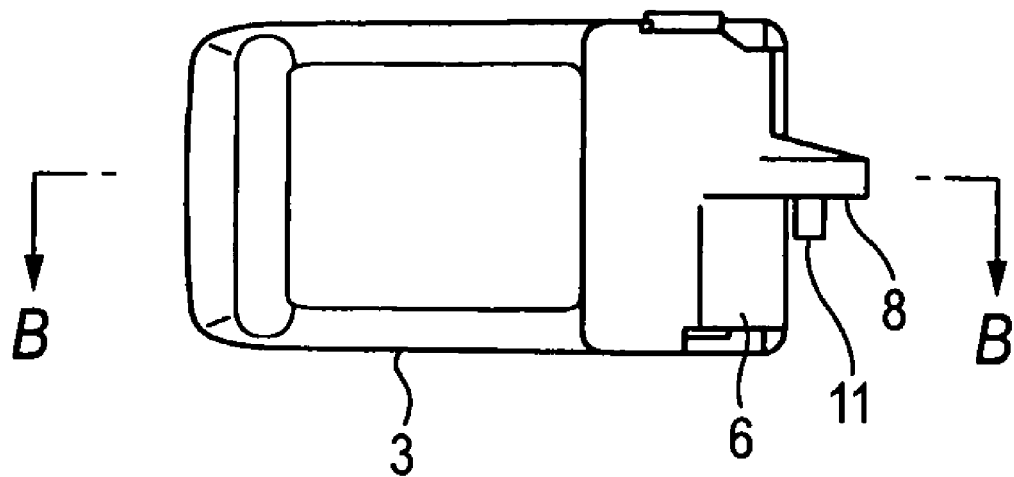
FIG. 4A is a front view of a hook and FIG. 4B is a sectional view taken on line B—B of FIG. 4A in the first embodiment.
Figure 4B:
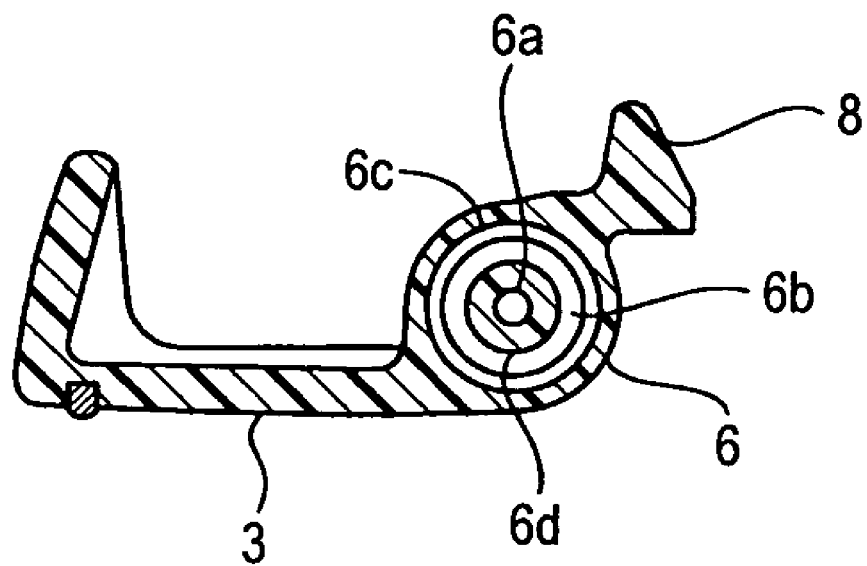

On the other hand, a rotation body 6 is integrally formed in a base of the hook 3 rotatably held in the retracting case 2. As shown in FIG. 4B, a shaft hole 6a is bored in the center of rotation of the rotation body 6. Also, another shaft hole 2e is bored in a position corresponding to the shaft hole 6a of the side of the retracting case 2. A support shaft 7 acting as a shaft body is inserted into both the shaft holes 6a, 2e and the rotation body 6 is rotatably supported in the retracting case 2 through the support shaft 7.

Also, an annular groove part 6b with a predetermined depth is formed on the same axis as that of the shaft hole 6a and one end of the rotation body 6, and a spring receiving recess 6f (see FIG. 10) is formed in the other end. Further, a bracket 8 is radially protruded from the side of the rotation body 6 and a lock pin 11 forming a push and push mechanism 10 is protrusively provided in one end of the top of the bracket 8.

The push and push mechanism 10 is a mechanism for opening and closing the hook 3 using a heart cam mechanism. A relief hole 2f for backward protruding the bracket 8 is bored in the retracting case 2 and a support bracket 2g is protrusively provided in one side of the relief hole 2f. A support pin 2j is protrusively provided in one side of the support bracket 2g. One end of a swing cam 12 is swingably supported in this support pin 2j through a damping washer 13 formed of non-woven fabric etc. in a state in which movement in an axial direction is allowed. The swing cam 12 is always energized to the front of the retracting case 2 by energization force of a spring 14 for cam and also is energized to the side of the support bracket 2g by weak force.

Figure 5:
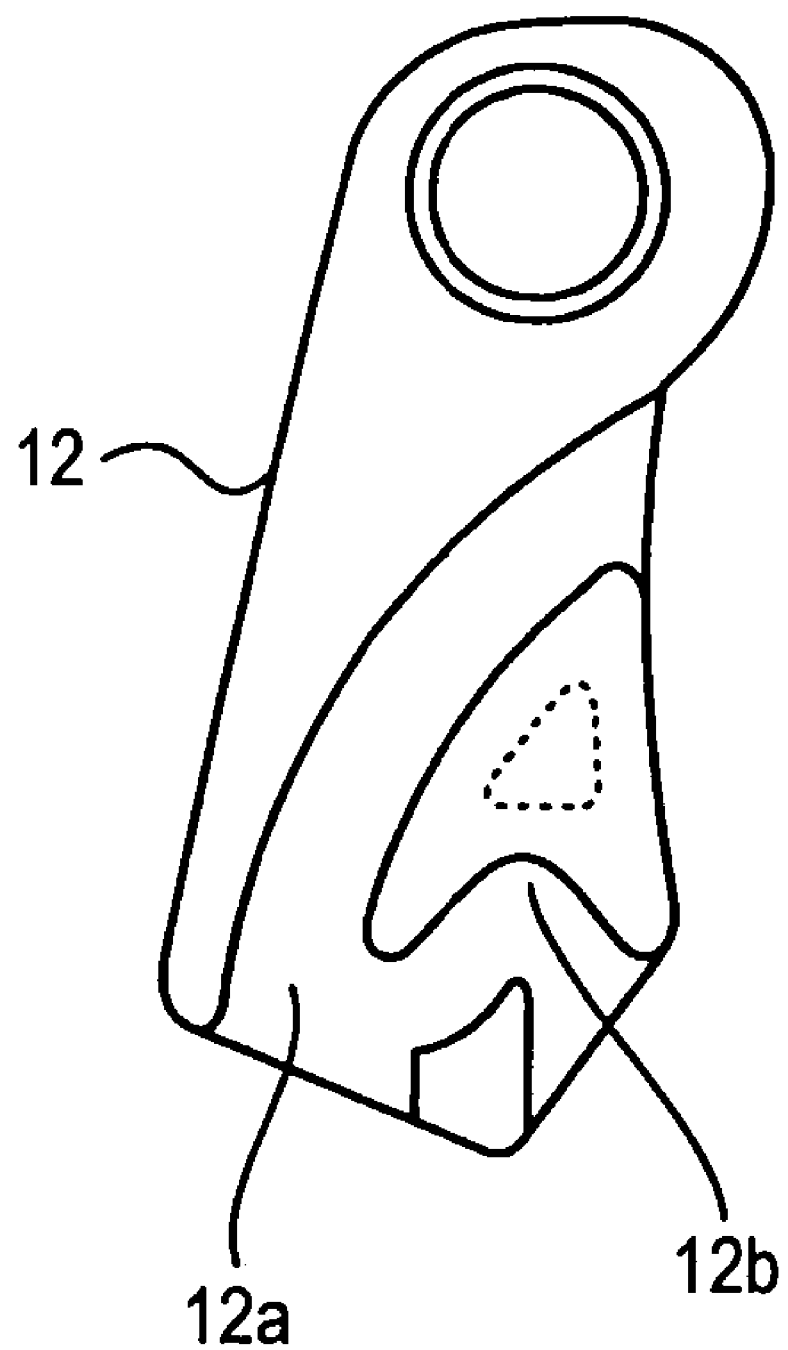
FIG. 5 is a front view of a swing cam in the first embodiment.

A well-known heart cam groove 12a is formed in the swing cam 12 and the lock pin 11 is engaged into this heart cam groove 12a. As shown in FIG. 5, an engagement stop groove part 12b for engaging and stopping the lock pin 11 and holding the hook 3 in a closed position (see FIG. 2A) is formed in the heart cam groove 12a.

On the other hand, the hook 3 is always energized in an opened direction by energization force of a spring 15 for hook. As shown in FIG. 7, in the hook 3 which is in an opened state, a wall part 6c (see FIG. 1) overhanging in a tangent direction from a circumferential wall of the bracket 8 of the rotation body 6 abuts on a receiving part 2h formed in the bottom of the retracting case 2 and the opened state is maintained. When the hook 3 is pressed in this state, the hook 3 rotates about the support shaft 7 in a closed direction against the energization force of the spring 15 for hook. In that case, when the lock pin 11 engages in the heart cam groove 12a formed in the swing cam 12 and the hook 3 reaches a closed position located in the substantially same plane with respect to the retracting case 2, the lock pin 11 engages in the engagement stop groove part 12b formed in the heart cam groove 12a and a closed state is maintained (see FIG. 7).

When the hook 3 held in the closed position is pressed further, engagement between the lock pin 11 and the engagement stop groove part 12b formed in the heart cam groove 12a is released and the hook 3 receives the energization force of the spring 15 for hook and is opened.

Figure 10:
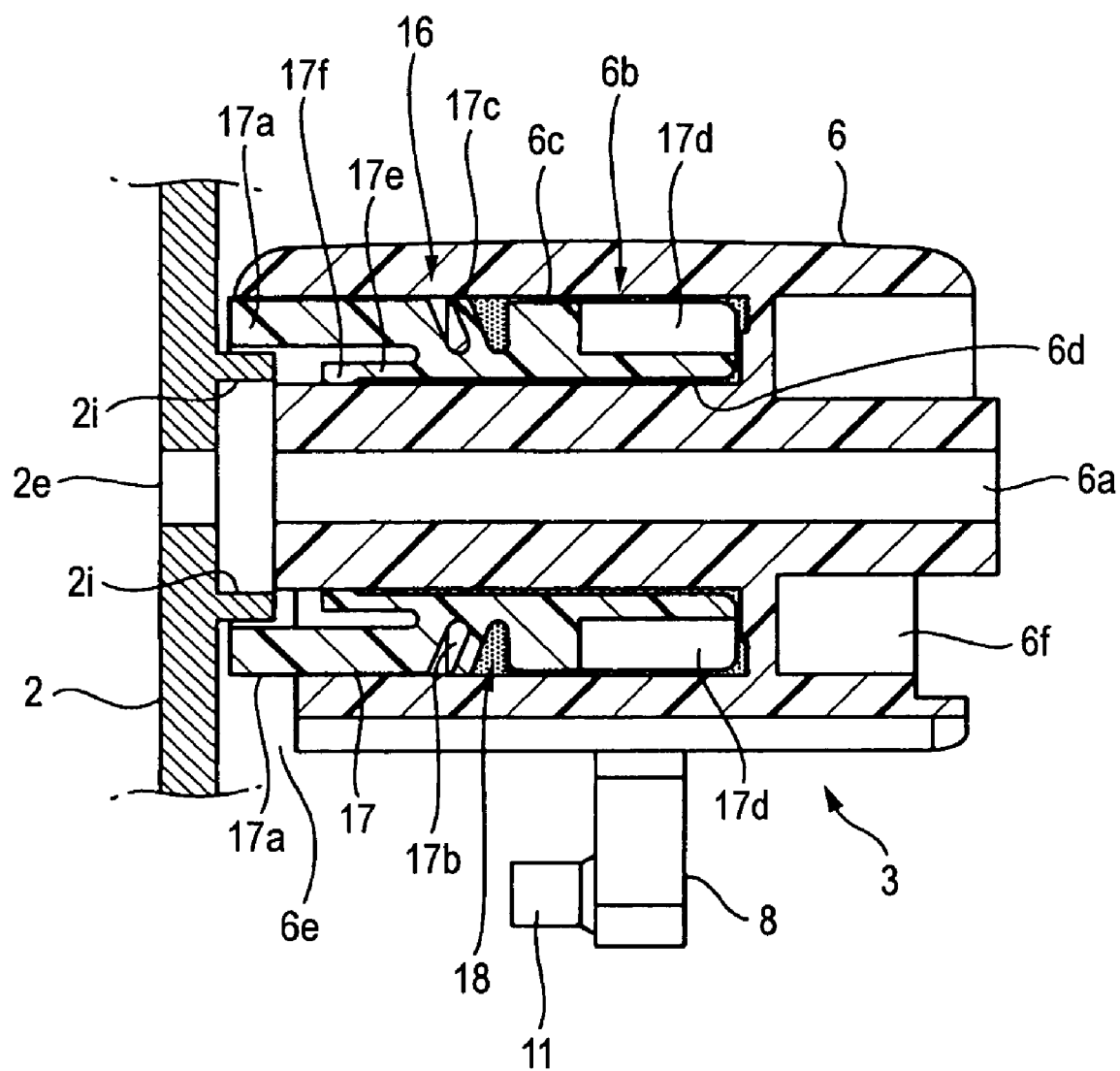
FIG. 10 is a sectional view of a rotation body in the first embodiment.

In the present embodiment, a damper mechanism 16 for slowly opening the hook 3 is provided together. Referring to a configuration of the damper mechanism 16, a rotor 17 is attached to the annular groove part 6b formed in the rotation body 6 as shown in FIGS. 1 and 10. The rotor 17 is formed of an elastic body such as rubber in substantially cylindrical shape, and the outer circumference is somewhat smaller than a diameter of a large diameter side wall surface 6c of the annular groove part 6b and also, the inner circumference is formed somewhat larger than a diameter of a small diameter side wall surface 6d.

Also, a pair of opposed engagement stop parts 17a are formed in one end of the rotor 17. On the other hand, protrusion elongated parts 2i for engaging with inner surfaces of the engagement stop parts 17a are mutually parallel provided in a surface of the retracting case 2 opposed to the engagement stop parts 17a in a state of sandwiching the shaft hole 2e in a depth direction from an opening plane of the retracting case 2 (see FIG. 3A). Incidentally, the protrusion elongated part 2i is formed in a length capable of being received in an inner circumference of the annular groove part 6b, and a relief groove part 6e for avoiding interference with the protrusion elongated parts 2i at the time of assembly is formed in the end of the rotation body 6. Further, the end of the shaft hole 6a of the rotation body 6 is retracted somewhat inwardly in order to avoid interference with the protrusion elongated parts 2i.

Figure 9A:
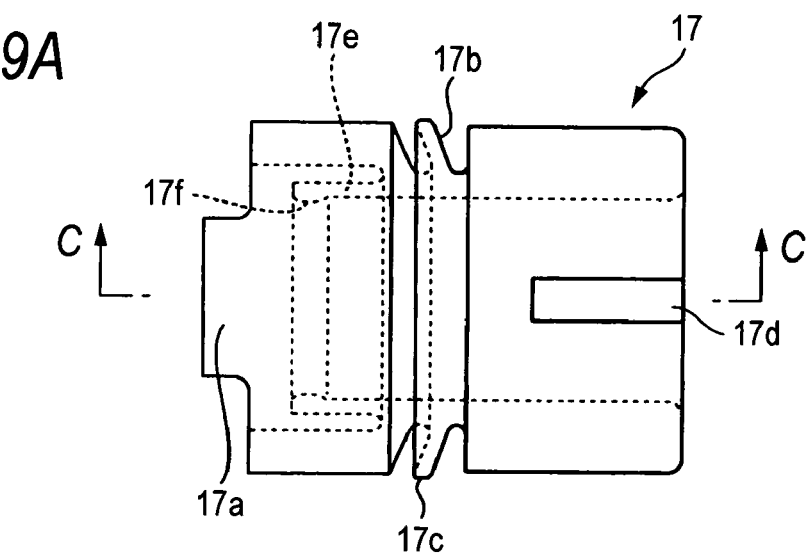
FIG. 9A is a side view of a rotor and FIG. 9B is a front view of the rotor and FIG. 9C is a sectional view taken on line C—C of FIG. 9A in the first embodiment.
Figure 9B:
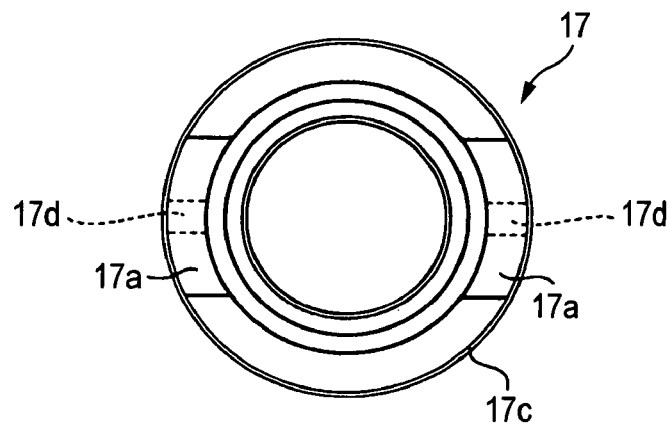
Figure 9C:
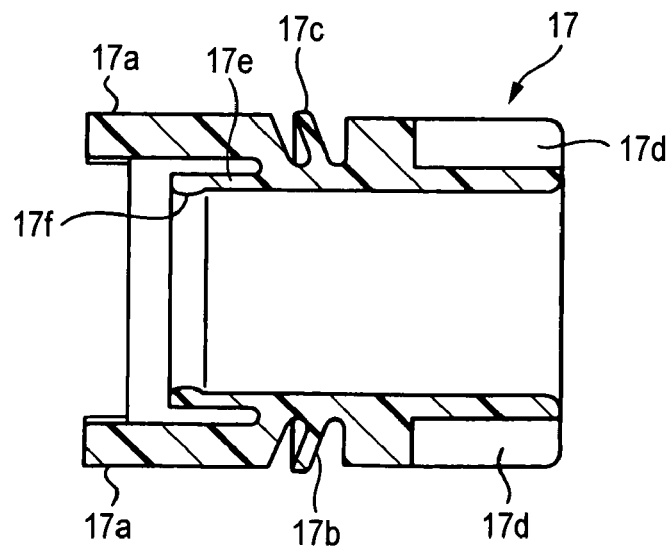

As shown in FIGS. 9A to 9C, a first elastic annulus 17b is formed in the middle of an outer circumference of the rotor 17. A first protrusion elongated annular part 17c of the top of the first elastic annulus 17b is formed in a diameter somewhat larger than that of the large diameter side wall surface 6c of the annular groove part 6b formed in the rotation body 6 and also is formed in relatively thin-walled cup shape inclined in a direction of the engagement stop parts 17a.

Also, air relief grooves 17d are formed in the outer circumference of the rotor 17. The air relief grooves 17d are formed from the other end (the end opposite to the end in which the engagement stop parts 17a are protrusively provided) of the rotor 17 to a position of a predetermined height. Incidentally, in the drawing, the air relief grooves 17d are formed in two places in an evenly spaced position, but may be formed in three or more places or one place. Further, the air relief grooves 17*d* may be formed in an inner circumference of the rotor 17.

Also, a second elastic annulus 17*e* with a relatively thin wall is formed along an axial direction to the side of the engagement stop parts 17*a* of the inner circumference of the rotor 17. The second elastic annulus 17*e* is formed by forming an annular groove in the outer circumference from the axial middle of the rotor 17 toward the engagement stop parts 17*a*. A second protrusion elongated annular part 17*f* with a diameter somewhat smaller than that of the small diameter side wall surface 6*d* of the annular groove part 6*b* of the rotation body 6 is formed in an inner circumference of the top end of the second elastic annulus 17*e*.

The second elastic annulus 17*e* and the first protrusion elongated annular part 17*c* of the first elastic annulus 17*b* formed in the rotor 17 are provided in a position offset in an axial direction. In this case, in FIGS. 9A to 9C, the first protrusion elongated annular part 17*c* of the first elastic annulus 17*b* is formed in the other end side (the end side opposite to the end in which the engagement stop parts 17*a* are protrusively provided) from the second elastic annulus 17*e*, but the first protrusion elongated annular part 17*c* of the first elastic annulus 17*b* may be formed in the side of the engagement stop parts 17*a* from the second elastic annulus 17*e*.

A relatively large amount of deformation in the case of elastically deforming the first elastic annulus 17*b* and the second elastic annulus 17*e* in a radial direction can be secured by offsetting the second elastic annulus 17*e* and the first protrusion elongated annular part 17*c* of the first elastic annulus 17*b* in the axial direction.

Also, as shown in FIG. 10, grease 18 acting as a viscous member having a predetermined viscosity is charged between the annular groove part 6*b* formed in the rotation body 6 and the rotor 17 inserted into this annular groove part 6*b*.

Next, an assembly procedure of the retractable hook apparatus 1 according to the present embodiment will be described.

In assembly of the damper mechanism 16, a proper amount of grease 18 having a predetermined viscosity is first charged into the annular groove part 6*b* of the rotation body 6 integrally formed in a base of the hook 3. Next, the rotor 17 having elasticity is attached to this annular groove part 6*b*. The outer circumference of the rotor 17 is formed somewhat smaller than a diameter of the large diameter side wall surface 6*c* of the annular groove part 6*b* and the inner circumference is formed somewhat larger than a diameter of the small diameter side wall surface 6*d* of the annular groove part 6*b*, so that the grease 18 penetrates into a gap between them.

Then, when the first protrusion elongated annular part 17*c* of the first elastic annulus 17*b* formed in the middle of the outer circumference of the rotor 17 is inserted into the annular groove part 6*b*, outer shape of this first protrusion elongated annular part 17*c* is formed somewhat larger than a diameter of the large diameter side wall surface 6*c* of the annular groove part 6*b*, so that the first protrusion elongated annular part 17*c* is elastically deformed and slidingly abuts on the large diameter side wall surface 6*c*.

Subsequently, when the second elastic annulus 17*e* formed in the inner circumference of the rotor 17 is inserted into the annular groove part 6*b* and the second protrusion elongated annular part 17*f* formed in the inner circumference of the top slidingly abuts on the small diameter side wall surface 6*d* of the annular groove part 6*b*, inner shape of the protrusion elongated annular part 17*f* is formed somewhat smaller than outer shape of the small diameter side wall surface 6*d*, so that the protrusion elongated annular part 17*f* is elastically deformed and slidingly abuts on the small diameter side wall surface 6*d*.

As a result of that, both the wall surfaces 6*c*, 6*d* of the annular groove part 6*b* are sealed with each of the elastic annuli 17*b*, 17*e* formed in the rotor 17 and the grease 18 is sealed in the inside and air is also sealed at the same time. As the rotor 17 is inserted into the annular groove part 6*b*, the air sealed in the inside is released to the air relief grooves 17*d* formed along an axial direction in the outer circumference of the rotor 17, so that the air is not compressed more than necessary and a burst of the rotor 17 and leakage of the grease 18 are prevented.

Thereafter, the rotation body 6 formed in the base of the hook 3 is assembled in the retracting case 2. Incidentally, the swing cam 12 constructing the push and push mechanism 10 is assembled in the support pin 2*j* protrusively provided in the support bracket 2*g* formed in a depth surface of the retracting case 2 in a predetermined manner.

In the case of assembly of the rotation body 6, first, a range between opposed surfaces of a pair of the engagement stop parts 17*a* protrusively provided in the top side of the rotor 17 is aligned with the relief groove part 6*e* formed in the end of the rotation body 6. Also, a coil part of the spring 15 for hook is received in the spring receiving recess 6*f* formed in the other end of the rotation body 6.

Then, the relief groove part 6*e* of the rotation body 6 is inserted so as to straddle a pair of the protrusion elongated parts 2*i* protrusively provided in the side of the retracting case 2 and opposed surfaces of a pair of the engagement stop parts 17*a* formed in the rotor 17 are engaged in the outsides of the protrusion elongated parts 2*i* and also the shaft hole 6*a* of the rotation body 6 is guided to the shaft hole 2*e* bored in the side of the retracting case 2. Also, one end of the spring 15 for hook is engaged and stopped in the retracting case 2.

Subsequently, the support shaft 7 is inserted into the mutually guided shaft holes 2*e*, 6*a* from the outside and the rotation body 6 is rotatably supported in the retracting case 2 through the support shaft 7. In this case, the engagement stop parts 17*a* of the rotor 17 are engaged in the protrusion elongated parts 2*i* formed in the retracting case 2, so that rotation of the rotor 17 is regulated. Also, the bracket 8 protrusively provided in a radial direction from an outer circumference of the rotation body 6 is protruded from the relief hole 2*f* bored in a depth surface of the retracting case 2 to the depth surface. Then, the lock pin 11 protruded from the bracket 8 to the side can be engaged in the heart cam groove 12*a* formed in the swing cam 12. Also, the hook 3 is always energized in an opened direction by energization force of the spring 15 for hook.

Also, the decorative plate 5 for hiding the screw 4 after assembly is mounted in an upper portion inside the retracting case 2. That is, the bosses 5*a* protrusively provided in both sides of a lower portion of the decorative plate 5 are supported in the support hole parts 2*b* bored in both sides of the retracting case 2. Further, the pawl parts 2*c* facing the support hole parts 2*b* are engaged in the notches 5*b* for opened position holding formed in the bosses 5*a* and an opened state of the decorative plate 5 is maintained as shown by a wavy line in FIG. 7. In the decorative plate 5, the notches 5*b* for opened position holding formed in the bosses 5*a* are engaged and stopped by the pawl parts 2*c*, so that the decorative plate 5 does not rattle even in the case of being influenced by vibration etc. at the time of transfer.

The retractable hook apparatus 1 assembled in this manner is mounted in the vehicle interior. In the case of mounting, the retracting case 2 is attached to a recess (not shown) previously formed in the vehicle interior and the screw 4 is inserted into the screw insertion hole 2a bored in a depth surface of the retracting case 2 and this screw 4 is screwed into a vehicle body and the retracting case 2 is fixed in the vehicle body.

Figure 8:
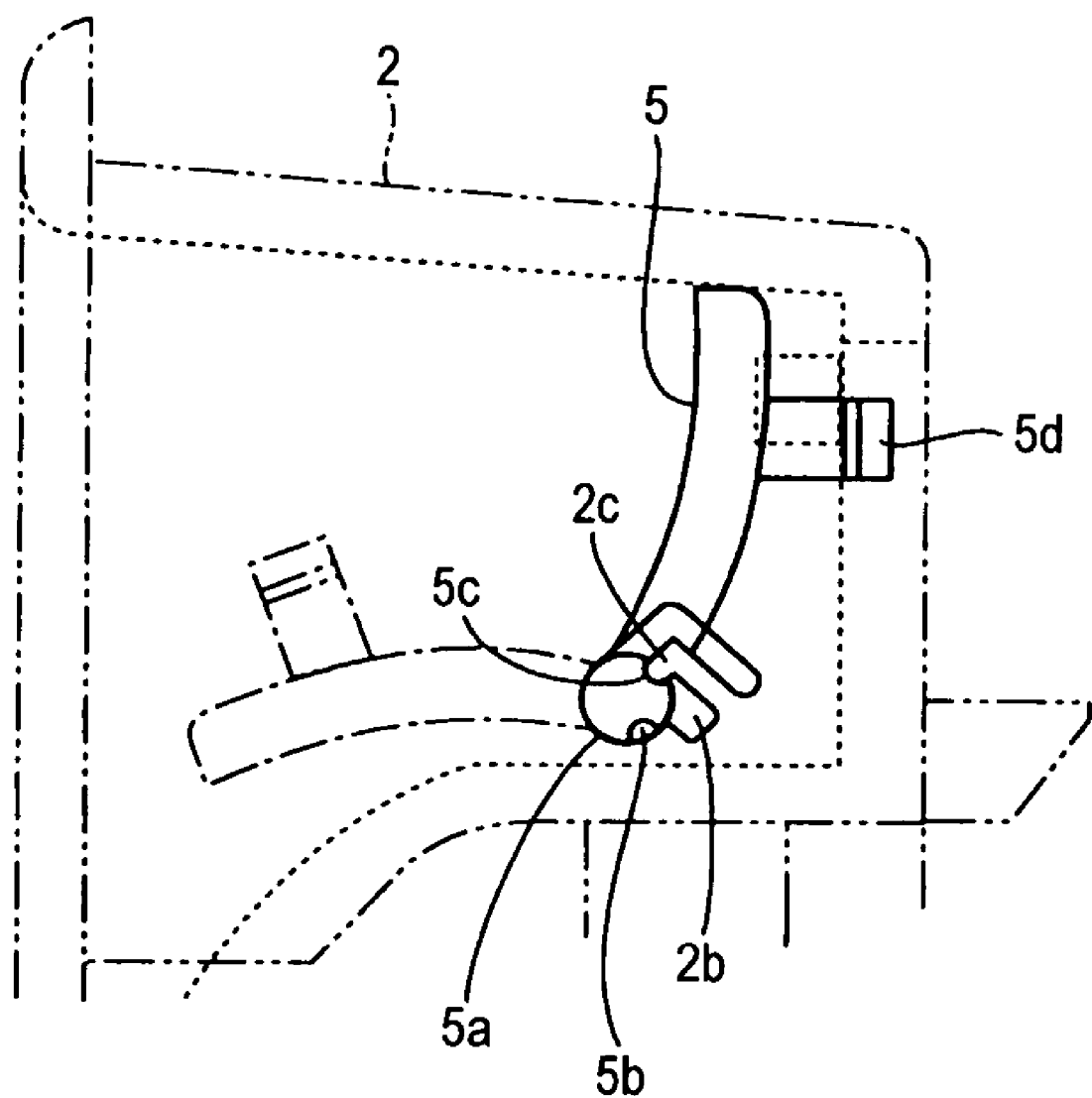
FIG. 8 is a side view showing a mounting state of the decorative plate in the first embodiment.

Thereafter, the decorative plate 5 is rotated about the bosses 5a and the notches 5c for closed position holding formed in the bosses 5a are engaged in the pawl parts 2c as shown in FIG. 8. Further, the hook parts 5d formed in both sides of an upper portion of the decorative plate 5 are engaged in the hole parts 2d bored in a depth surface of the retracting case 2 to maintain a closed state and the screw 4 is hidden and assembly is completed.

Figure 2A:
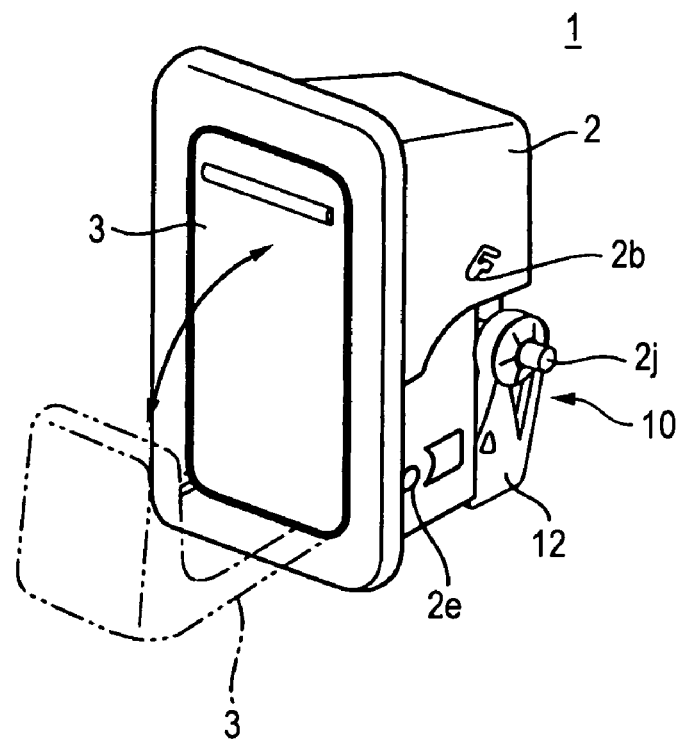
FIG. 2A is a perspective view seen from the front of the retractable hook apparatus and FIG. 2B is a perspective view seen from the back of the retractable hook apparatus in the first embodiment.
Figure 2B:
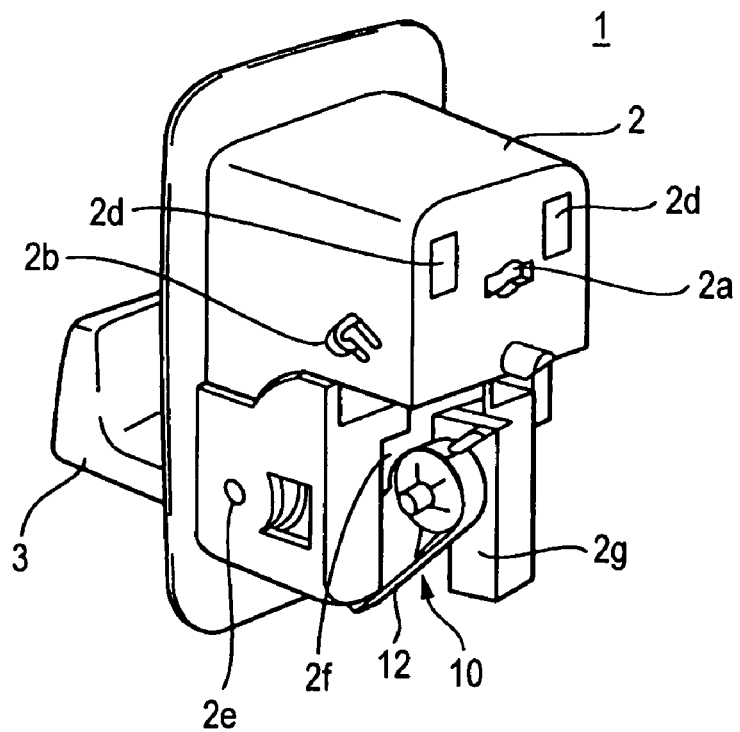

Immediately after the retractable hook apparatus 1 is assembled with respect to the vehicle body, the hook 3 receives energization force of the spring 15 for hook and is in an opened state as shown in FIGS. 2B and 7. At this time, the hook 3 maintains the opened state by abutting the wall part 6c of the rotation body 6 on the receiving part 2h formed in the bottom of the retracting case 2. Also, the lock pin 11 protruded from the side of the bracket 8 disengages from the heart cam groove 12a formed in the swing cam 12.

When the hook 3 is pressed from such a state in a retracting direction against the energization force of the spring 15 for hook, the hook 3 rotates with the hook 3 supported in the support shaft 7 inserted into the shaft hole 6a of the rotation body 6. At that time, the lock pin 11 engages into the heart cam groove 12a formed in the swing cam 12. The swing cam 12 receives energization force of the spring 14 for cam and swings along movement of the lock pin 11.

Then, when the hook 3 reaches the substantially same plane as the retracting case 2, the lock pin 11 is engaged and stopped in the engagement stop groove part 12b of the heart cam groove 12a and a closed state is maintained.

Thereafter, when the hook 3 is pressed again, engagement between the lock pin 11 and the engagement stop groove part 12b formed in the heart cam groove 12a is released and the hook 3 receives the energization force of the spring 15 for hook and is opened. At that time, in the rotor 17 inserted into the annular groove part 6b formed in the rotation body 6, the engagement stop parts 17a of the rotor 17 are engaged in the protrusion elongated parts 2i formed in the retracting case 2 and rotation is regulated, so that the rotor 17 is damped by fluid resistance of the grease 18 charged between the annular groove part 6b and the rotor 17 and the hook 3 is slowly rotated.

When the hook 3 rotates in an opened direction, the lock pin 11 disengages from the heart cam groove 12a formed in the swing cam 12. Immediately before the lock pin 11 disengages from the swing cam 12, the swing cam 12 is pressed by the lock pin 11 and somewhat swings in an axial direction and when the lock pin 11 disengages from the swing cam 12, the swing cam 12 is returned by the energization force of the spring 14 for cam. At that time, small impact sound is emitted, but the impact sound is deadened by the damping washer 13 interposed between the swing cam 12 and the support bracket 2g.

By the way, the grease 18 has a predetermined viscosity and is sealed by the first elastic annulus 17b and the second elastic annulus 17e formed in the rotor 17, so that the grease 18 does not leak to the outside and high reliability can be ensured. Also, since it is constructed so that the grease 18 is sealed by shape of the rotor 17 without providing a seal member separately, simplification of structure can be achieved.

Incidentally, in the present embodiment, it is constructed so as to seal the grease 18 by the elastic annuli 17b, 17e formed in the rotor 17, so that even when oil is used instead of the grease 18, the oil does not leak to the outside. Therefore, damping with respect to the hook 3 can be adjusted by properly selecting viscosity of the grease 18 or the oil, so that high versatility can be obtained. Also, a plurality of the air relief grooves 17d may be formed in a recessed state in a position between the first elastic annulus 17b and the second elastic annulus 17e.

Figure 11A:
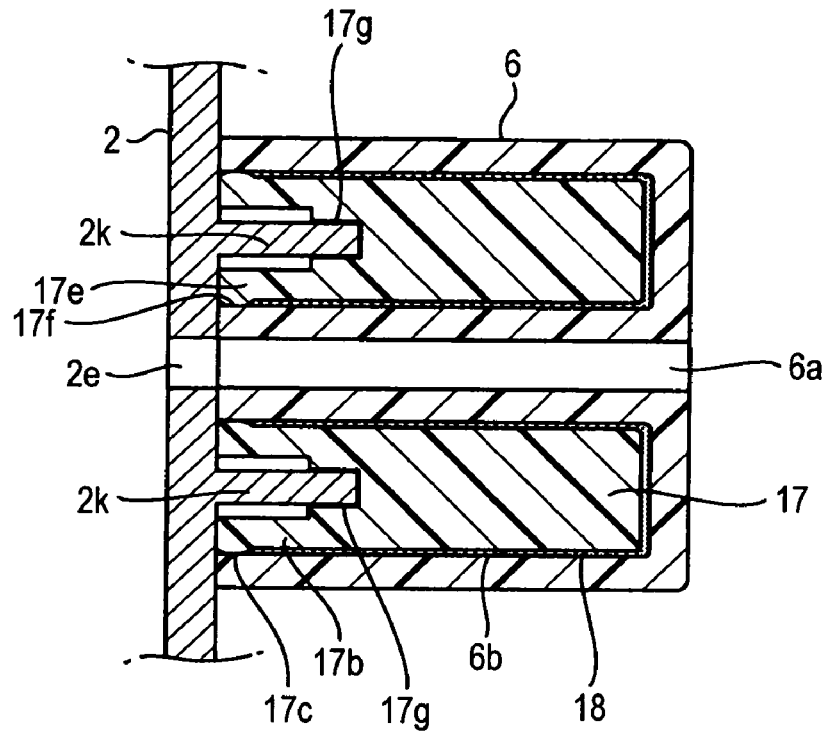
FIGS. 11A and 11B show a second embodiment.
Figure 11B:
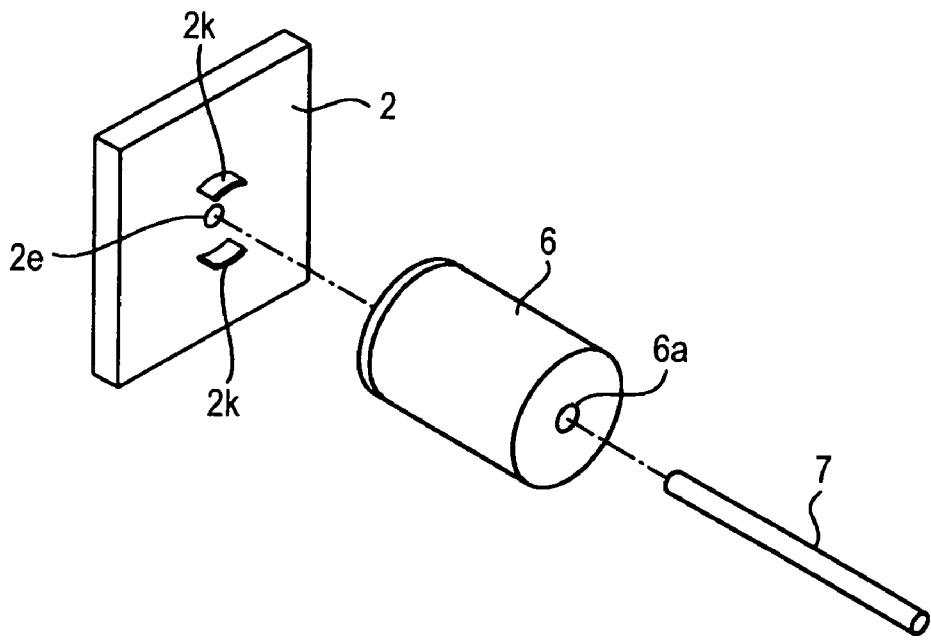
Figure 12:
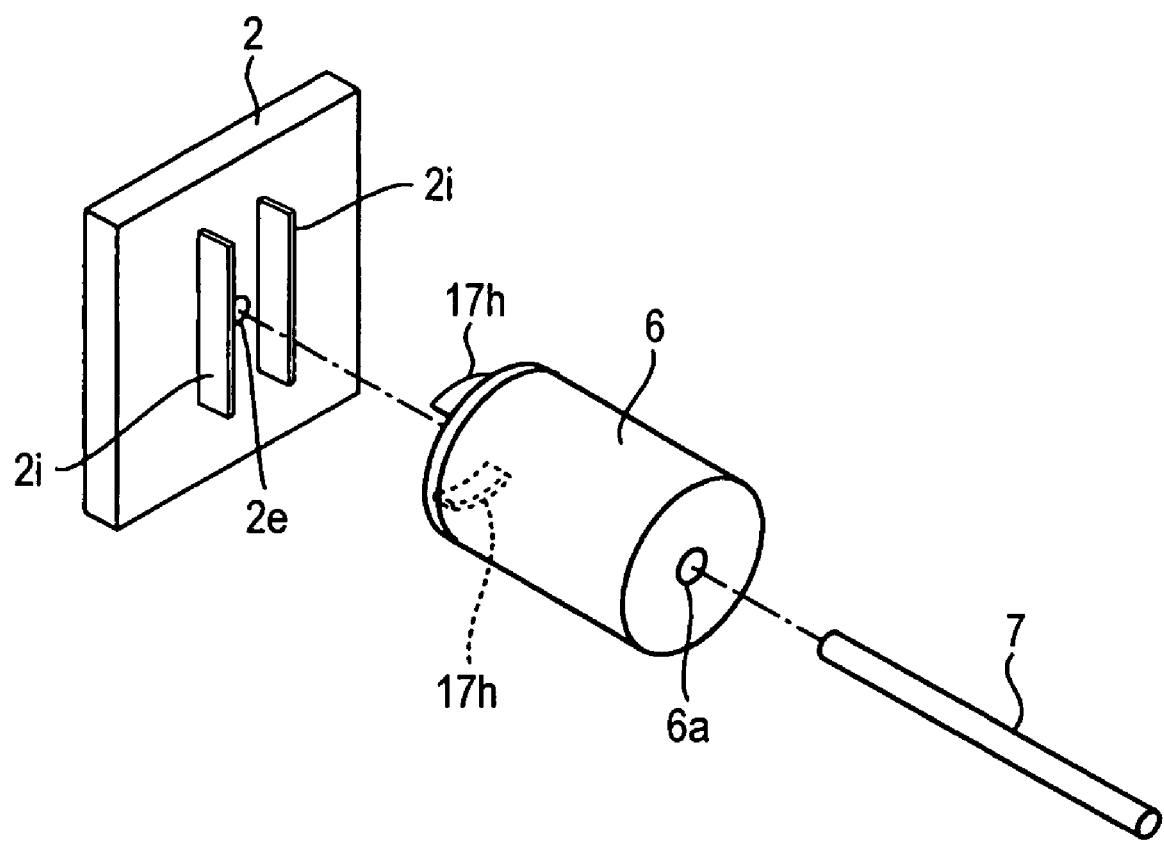
FIG. 12 is a main exploded perspective view showing a third embodiment.
Figure 13A:
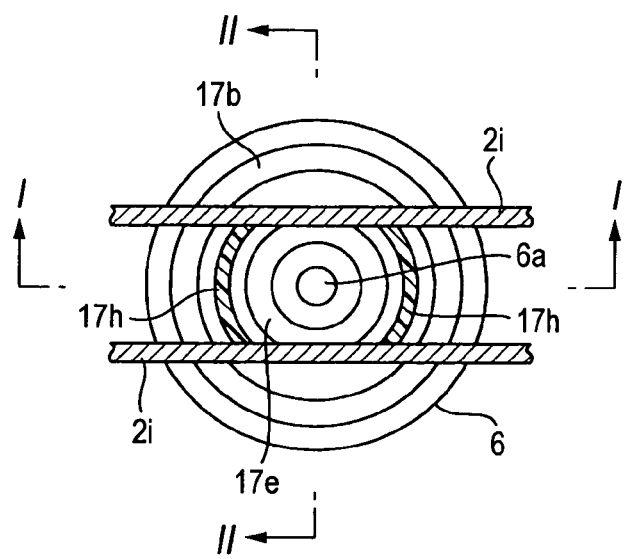
FIGS. 13A to 13C show the third embodiment.
Figure 13B:
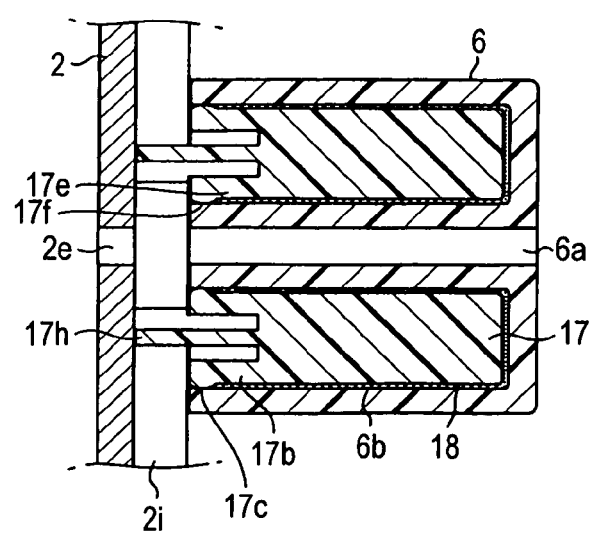
Figure 13C:
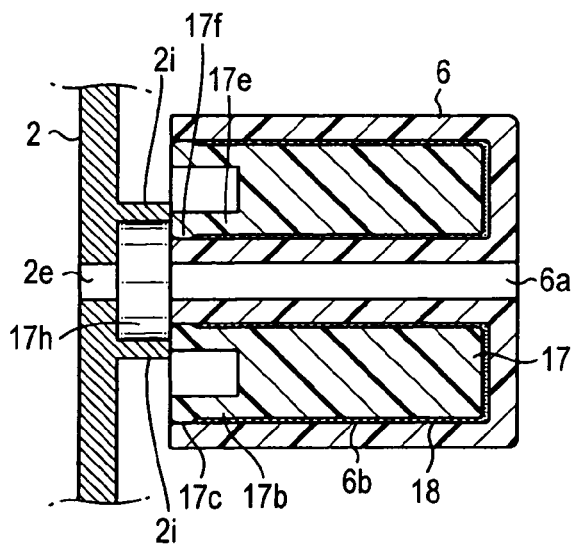

A second embodiment of the invention is shown in FIGS. 11A and 11B. In the present embodiment, the case of attaching a rotation body 6 from a perpendicular direction with respect to a mounting surface of a retracting case 2 etc. will be illustrated. Incidentally, description is omitted by attaching the same numerals to the same configuration portions as those of the first embodiment.

That is, a first elastic annulus 17b and a second elastic annulus 17e are formed in the substantially same position of the top side of a rotor 17, and a first protrusion elongated annular part 17c and a second protrusion elongated annular part 17f are respectively formed in the top outer circumference and the top inner circumference of each of the elastic annuli 17b, 17e, and further a groove part 17g with circular arc shape into which a pair of opposed protrusion parts 2k protrusively provided from the side of a retracting case 2 in circular arc shape about a shaft hole 2e are fitted is formed in the bottom of a groove part of cylindrical shape with the bottom surrounded by the first elastic annulus 17b and the second elastic annulus 17e.

According to the present embodiment, since it is constructed so as to seal the opening end side of an annular groove part 6b by the first protrusion elongated annular part 17c and the second protrusion elongated annular part 17f, a slidingly abutting region between the rotor 17 and grease 18 can be provided in the substantially whole of an axial direction, so that higher damping effect can be obtained.

Also, by only attaching the groove part 17g formed in the top of the rotor 17 to the protrusion parts 2k protrusively provided in the side of the retracting case 2 from the axial direction, rotation of the rotor 17 can be regulated, so that assembly is facilitated.

Incidentally, also in the second embodiment, air relief grooves similar to those of the first embodiment may be formed along an axial direction in an outer circumference of the rotor 17. In this case, the air relief grooves may be formed continuously in the range from the end of the bottom side of the annular groove part 6b to at least one of the first elastic annulus 17b and the second elastic annulus 17e of the rotor 17.

A third embodiment of the invention is shown in FIGS. 12 and 13A to 13C. In the present embodiment, the case of parallel attaching a rotation body 6 with respect to a mounting surface of a retracting case 2 etc. in a manner similar to the case of the first embodiment will be illustrated. Incidentally, description is omitted by attaching the same numerals to the same configuration portions as those of the first embodiment.

A first elastic annulus 17b and a second elastic annulus 17e formed in a rotor 17 are formed in a position similar to that of the second embodiment.

Also, in the first embodiment, it is constructed so that the protrusion elongated parts 2i protrusively provided in the side of a mounting surface are engaged in a pair of the opposed engagement stop parts 17a formed in the rotor 17, but in the present embodiment, it is constructed so that rotation of the rotor 17 is regulated by attaching the ends of a pair of opposed engagement stop parts 17h which have circular arc shape about a shaft hole 6a and are protrusively provided from the bottom of a groove part of cylindrical shape with the bottom surrounded by the first elastic annulus 17b and the second elastic annulus 17e so as to pinch and support the ends of the engagement stop parts 17h between protrusion elongated parts 2i.

Figure 14:
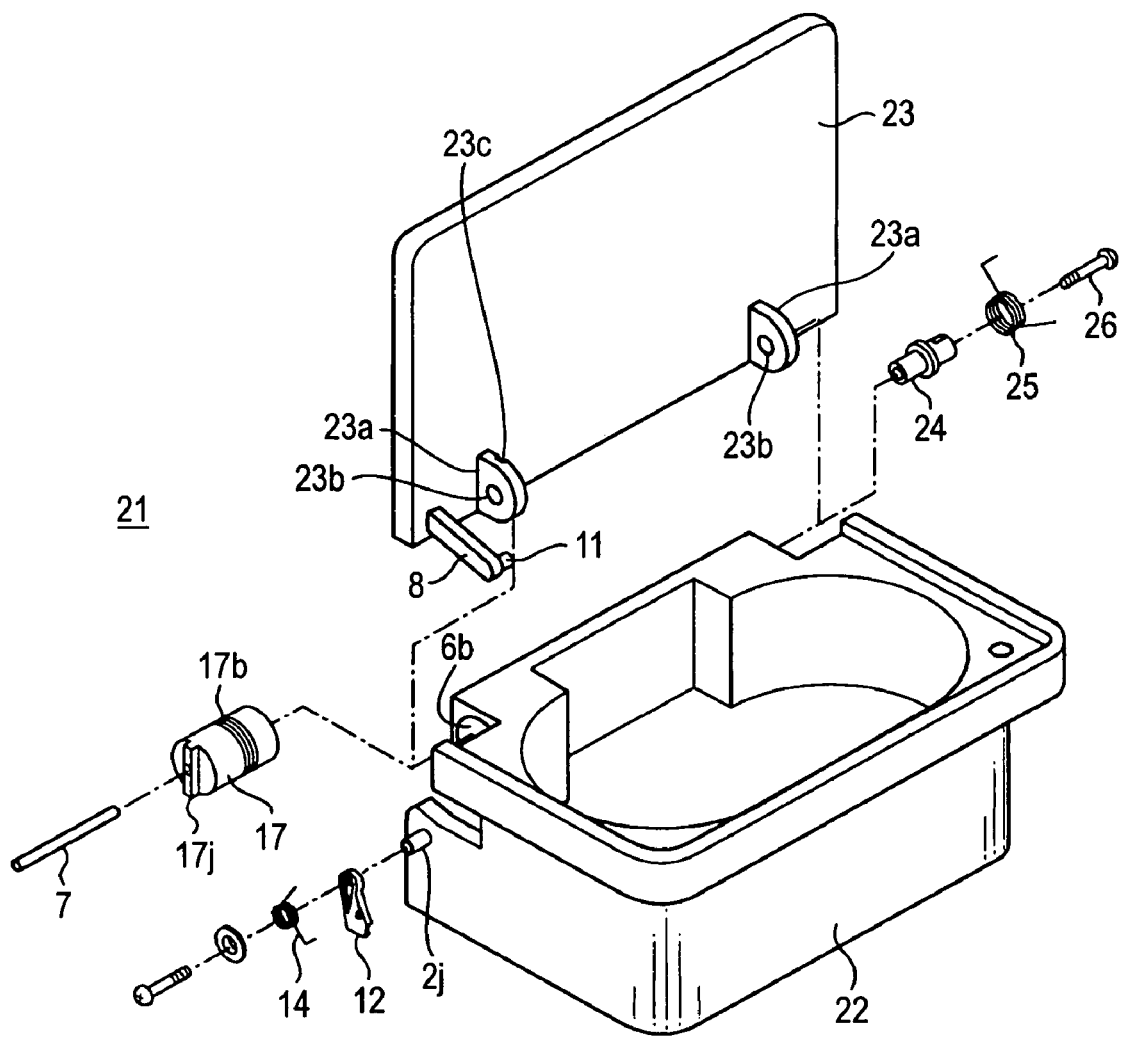
FIG. 14 is an exploded perspective view of a vessel holder according to a fourth embodiment.
Figure 15:
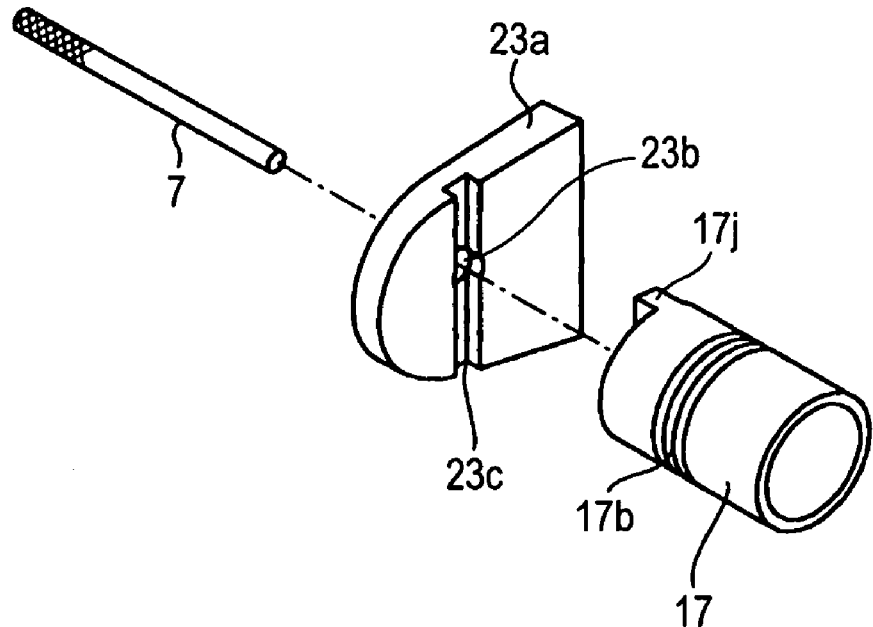
FIG. 15 is a main exploded perspective view of the vessel holder in the fourth embodiment.

A fourth embodiment of the invention is shown in FIGS. 14 and 15. In the present embodiment, the case of applying the invention to a vessel holder 21 will be described.

The vessel holder 21 is provided in a center console (not shown) etc. of the vehicle interior, and has a holder body 22 and a lid 23 for opening and closing an upper surface of the holder body 22. The lid 23 is opened and closed by the substantially same configuration as that of the push and push mechanism 10 shown in the first embodiment. Therefore, description is omitted by attaching the same numeral to a configuration of a push and push mechanism 10.

Also, a damper mechanism 16 basically has a configuration similar to that of the first embodiment. That is, an annular groove part 6b with a predetermined depth in one side of the back of the holder body 22 is formed in a manner similar to the rotation body 6 of the first embodiment. A rotor 17 is attached to this annular groove part 6b.

A top surface of the rotor 17 is blocked, and one elongated engagement stop part 17j passing through a center line is protrusively provided in the top surface. A pair of hinge brackets 23a are oppositely provided at a predetermined spacing in the inside of the base side of the lid 23, and a groove part 23c for engaging in the engagement stop part 17j protrusively provided in the rotor 17 is formed in an opposed surface of one hinge bracket 23a.

Also, the other hinge bracket 23a is rotatably supported in the other side of the back of the holder body 22 through a support shaft 24 and also is always energized in an opened direction by a spring 25 for lid. Further, disengagement stop in an axial direction is made by a screw 26.

In such a configuration, when the lid 23 by which the holder body 22 is blocked is pressed, engagement between a lock pin 11 forming a push and push mechanism 10 and an engagement stop groove part 12b of a heart cam groove 12a (see FIG. 5) formed in a swing cam 12 is released and the lid 23 rotates in an opened direction by energization force of the spring 25 for lid.

At that time, the engagement stop part 17j of the rotor 17 is engaged in the groove part 23c formed in one hinge bracket 23a, so that the rotor 17 rotates integrally with the lid 23. The rotor 17 is inserted into the annular groove part 6b formed in the side of the holder body 22 and grease 18 (see FIG. 10) is charged between the annular groove part 6b and the rotor 17, so that with rotation of the lid 23 in an opened direction, the rotor 17 is damped by fluid resistance of the grease 18 and the lid 23 is slowly opened.

Figure 16:
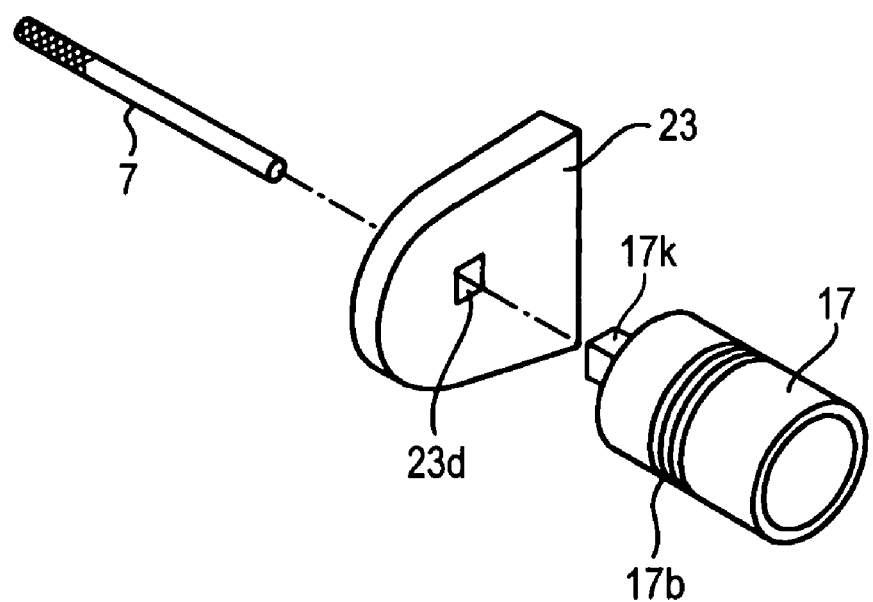
FIG. 16 is an exploded perspective view corresponding to FIG. 14 according to a fifth embodiment.

Also, a fifth embodiment of the invention is shown in FIG. 16. The present embodiment is a modified example of the fourth embodiment described above. In the fourth embodiment, the engagement stop part 17j formed in the top surface of the rotor 17 is engaged in the groove part 23c of the hinge bracket 23a, but in the present embodiment, a square engagement stop part 17k is protrusively provided in the center of a rotor 17 and a square hole 23d for engaging in the engagement stop part 17k is bored in a hinge bracket 23a.

The fourth embodiment can be applied to the case of engaging the engagement stop part 17j of the rotor 17 from a parallel direction with respect to the hinge bracket 23a, but the present embodiment can be applied to the case of engaging the engagement stop part 17k protrusively provided in the rotor 17 from a perpendicular direction with respect to the square hole 23d of the hinge bracket 23a.

Figure 17:
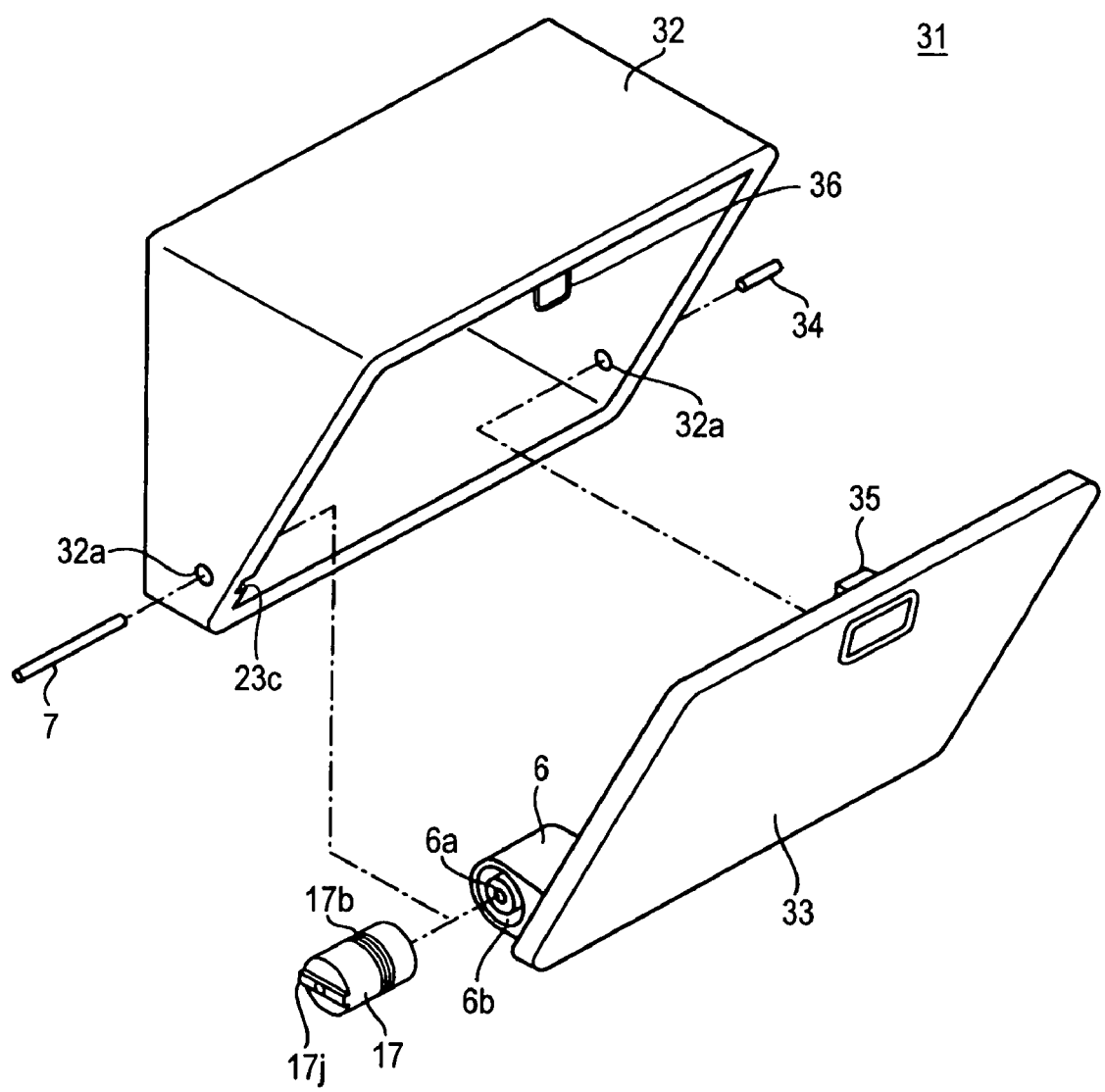
FIG. 17 is an exploded perspective view of a glove box according to a sixth embodiment.

A sixth embodiment of the invention is shown in FIG. 17. In the present embodiment, the case of applying the invention to a glove box 31 will be described.

In a lid 33 for opening and closing a box body 32 of the glove box 31, the surface area is relatively wide and the weight is large by the wide surface area as compared with the hook 3 of the retractable hook apparatus 1 or the lid 23 of the vessel holder 21, so that the lid 33 can be opened by the own weight.

Therefore, a spring for energizing the lid 33 in an opened direction is unnecessary. Also, since it is constructed so that the lid 33 is closed by engaging a latch 35 provided in the lid 33 into a striker 36 provided in the box body 32 and is opened by releasing engagement of the latch 35 with the striker 36, a push and push mechanism 10 is also unnecessary.

A rotation body 6 having a configuration similar to that of the first embodiment is fixedly provided in a base of the lid 33, and a rotor 17 is attached to an annular groove part 6b with a predetermined depth formed in this rotation body 6. The rotor 17 has a configuration similar to that of the fourth embodiment and an engagement stop part 17j formed in the top is engaged in a groove part 23c formed in the side of the box body 32 and the rotor 17 is rotatably supported by a support shaft 7.

When engagement of the latch 35 with the striker 36 is released and the lid 33 is opened, the lid 33 rotates in an opened direction by the own weight.

At that time, the rotor 17 is engaged in the groove part 23c formed in the box body 32 and rotation is regulated, so that the lid 33 is damped by fluid resistance of grease 18 charged between the annular groove part 6b and the rotor 17 and is slowly opened.

Figure 18:
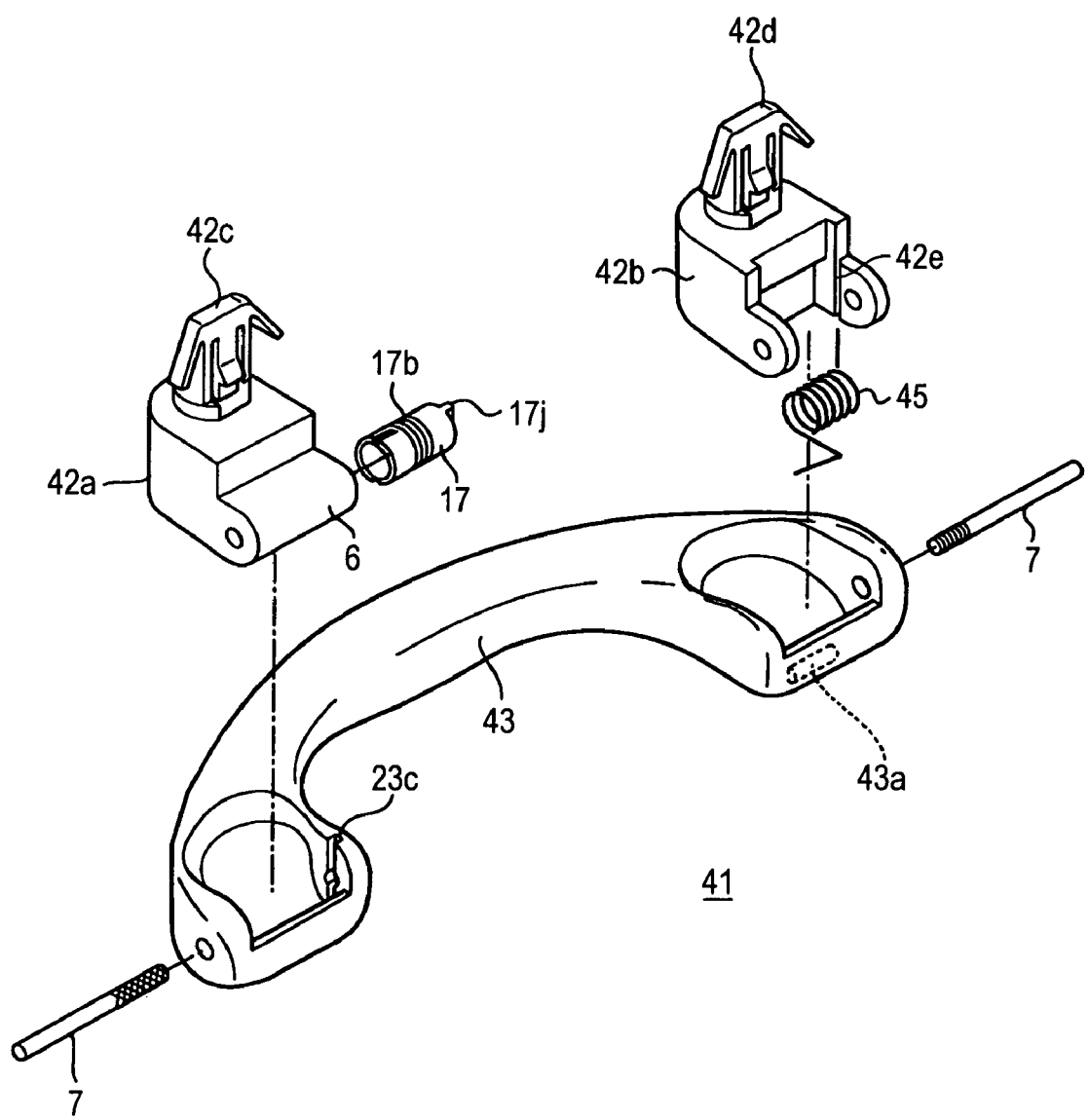
FIG. 18 is an exploded perspective view of a retractable assist grip apparatus according to a seventh embodiment.

A seventh embodiment of the invention is shown in FIG. 18. In the present embodiment, the case of applying the invention to a retractable assist grip apparatus 41 will be described.

In the retractable assist grip apparatus 41, elastic legs 42c, 42d are pushed and engaged in mounting holes formed in an upper portion of a side wall of the vehicle interior and thereby a pair of support bodies 42a, 42b are fixedly provided at a predetermined spacing in the upper portion of the side wall and both ends of a grip 43 are rotatably supported in each of the support bodies 42a, 42b through a support shaft 7, respectively.

A rotation body 6 is formed integrally with one support body 42a. This rotation body 6 has a configuration similar to that of the first embodiment and a rotor 17 is attached to an annular groove part 6b (see FIG. 10) with a predetermined depth formed in the inside. Also, the rotor 17 has a configuration similar to that of the fourth embodiment.

An engagement stop part 17j formed in a top surface of the rotor 17 is engaged in a groove part 23c formed in the grip 43 to rotate integrally with the grip 43. Also, both ends of a spring 45 for grip are engaged and stopped in a groove 42e formed in the other support body 42b and a groove 43a formed in the grip 43 and the grip 43 is energized in a direction abutting on the side wall.

The grip 43 is normally retracted into the side wall of the vehicle interior in a folded state by energization force of the spring 45 for grip.

When a passenger grasps and pulls the grip 43 from this state, the grip 43 rotates against the energization force of the spring 45 for grip and is offered for use.

On the other hand, when the grasp with respect to the grip 43 is released, the grip 43 attempts to return to a retracted position by the energization force of the spring 45 for grip, but at that time, the rotor 17 rotates integrally with the grip 43 with respect to the rotation body 6 fixedly provided in the support body 42, so that the grip 43 is damped by fluid resistance of grease 18 (see FIG. 10) charged between the annular groove part 6b and the rotor 17 and is slowly returned.

An opening and closing damping apparatus of the invention can be applied to not only structure bodies having various opening and closing mechanisms provided in the vehicle interior of a vehicle such as an automobile, for example, a retractable hook apparatus, a retractable assist grip apparatus, a retractable storage box, a cup holder, a glove box, a console box for storing a small article, eyeglasses, an ashtray having a push and push mechanism but also structure bodies other than the vehicle.

What is claimed is:

1. An opening and closing damping apparatus for applying damping to rotation of a rotation body pivoted openably and closably with respect to a support body, the opening and closing damping apparatus comprising:
    an engagement part;
    an annular groove part with a bottom;
    a substantially cylindrical rotor;
    an engagement stop part; and
    a viscous member, wherein:
    the engagement part is provided in one of the support body and the rotation body and the annular groove part with the bottom is provided on a same axis as a center of rotation of the other;
    the substantially cylindrical rotor is fitted into the annular groove part with the bottom;
    the engagement stop part engaged and stopped in the engagement part is provided in an end of the rotor;
    the viscous member is interposed between the rotor and the annular groove part with the bottom; and
    wherein the rotor comprises:
        a first elastic annulus having a first elastic protrusion elongated annulus sealing a first wall surface of said annular groove part; and
        a second elastic annulus having a second elastic protrusion elongated annulus sealing a second wall surface of said annular groove part, wherein both of said first elastic protrusion elongated annulus and said second elastic protrusion elongated annulus are formed from said rotor.

2. The opening and closing damping apparatus according to claim 1, wherein the engagement part is constructed of two protrusion elongated parts protruded in parallel and the engagement stop part is formed in protrusion shape engaged between both of said protrusion elongated parts.

3. The apparatus of claim 1, wherein the first wall surface of the annular groove part has a diameter that is larger than the second wall surface, wherein said first elastic protrusion elongated annulus has an unstrained diameter that is larger than a diameter of the first wall surface such that said first elastic protrusion elongated annulus is elastically-deformed into contact with said first wall surface, and wherein said second elastic protrusion elongated annulus has an unstrained diameter that is smaller than the diameter of the second wall surface such that said second elastic protrusion elongated annulus is elastically-deformed into contact with said second wall surface.

4. The opening and closing damping apparatus according to claim 1, wherein:
    said first elastic annulus and said second elastic annulus are respectively provided in an outer circumference and an inner circumference of the rotor.

5. The opening and closing damping apparatus according to claim 4, wherein the first elastic annulus is provided closer to the bottom of the annular groove part than the second elastic annulus.

6. The opening and closing damping apparatus according to claim 4, wherein an air relief groove is provided between the bottom of the annular groove and one of the first elastic annulus and the second elastic annulus of the rotor.

7. The opening and closing damping apparatus according to claim 6, wherein:
    the first elastic annulus and the second elastic annulus are provided at a substantially equal distance from the bottom of the annular groove part; and
    the air relief groove is formed continuously in a range from the bottom of the annular groove part to at least one of the first elastic annulus and the second elastic annulus.

8. An apparatus for damping the rotation of a rotation body with respect to a support body, the apparatus comprising:
    a rotor; and
    a viscous material,
    wherein one of the rotation body and the support body defines an annular groove,
    wherein the annular groove receives the rotor and the viscous material, and
    wherein the rotor comprises:
        a first elastic protrusion slidingly abutting a first wall of said annular groove to seal said viscous material in said annular groove; and
        a second elastic protrusion slidingly abutting a second wall of said annular groove to seal said viscous material in said annular groove, wherein the first wall of the annular groove has a diameter that is larger than the second wall, wherein said first elastic protrusion has an unstrained diameter that is larger than the diameter of the first wall such that said first elastic protrusion is elastically-deformed into contact with said first wall, and wherein said second elastic protrusion has an unstrained diameter that is smaller than the diameter of the second wall such that said second elastic protrusion is elastically-deformed into contact with said second wall, wherein both of said first elastic protrusion and said second elastic protrusion are formed from said rotor.

9. An apparatus for damping the rotation of a rotation body with respect to a support body, the apparatus comprising:
    a rotation body;
    a support body;
    a rotor; and
    a viscous material,
    wherein one of the rotation body and the support body defines an annular groove,
    wherein the annular groove receives the rotor and the viscous material, and
    wherein the rotor comprises:
        a first elastic protrusion sealing a first wall of said annular groove; and a second elastic protrusion sealing a second wall of said annular groove, wherein the first wall of the annular groove has a diameter that is larger than the second wall, wherein said first elastic protrusion has an unstrained diameter that is larger than the diameter of the first wall such that said first elastic protrusion is elastically-deformed into contact with said first wall, and wherein said second elastic protrusion has an unstrained diameter that is smaller than the diameter of the second wall such that said second elastic protrusion is elastically-deformed into contact with said second wall, wherein both of said first elastic protrusion and said second elastic protrusion are formed from said rotor.

10. An apparatus for damping the rotation of a rotation body with respect to a support body, the apparatus comprising:

a rotation body;
a support body;
a rotor; and
a viscous material, wherein one of the rotation body and the support body defines an annular groove, wherein the annular groove receives the rotor and the viscous material, and wherein the rotor comprises:

a first elastic protrusion sealing a first wall of said annular groove; and a second elastic protrusion sealing a second wall of said annular groove, wherein one of the rotation body and the support body includes an engagement part and wherein the rotor comprises an engagement stop part engaging said engagement part in an end of said rotor, and wherein an annular groove in said rotor is defined by said second elastic protrusion and said engagement stop part. wherein both of said first elastic protrusion and said second elastic protrusion are formed from said rotor.

* * * * *